July 30, 1963   F. G. PERRY ET AL   3,099,732
ELECTRICAL CONTROL DEVICE
Filed May 31, 1961   3 Sheets-Sheet 1
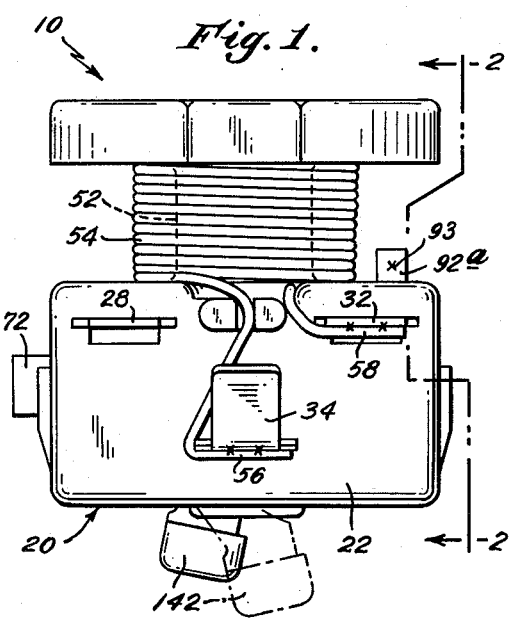
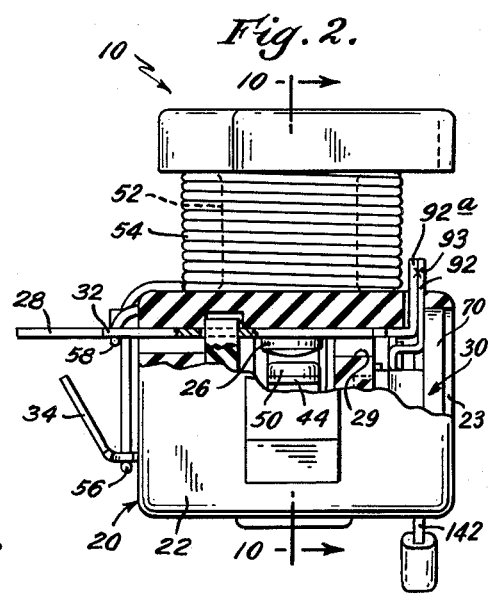
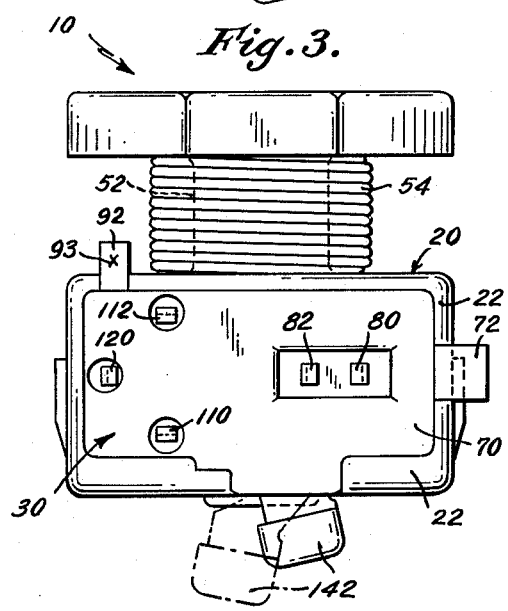
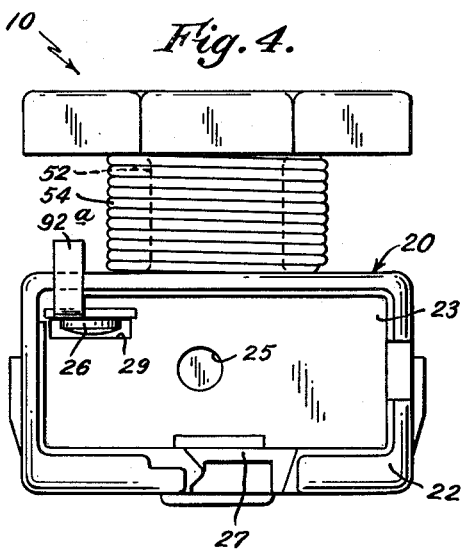
Inventors:
Frederick G. Perry,
Aimé J. Grenier,
John J. Wilson III,
by Harold Levine Att'y.

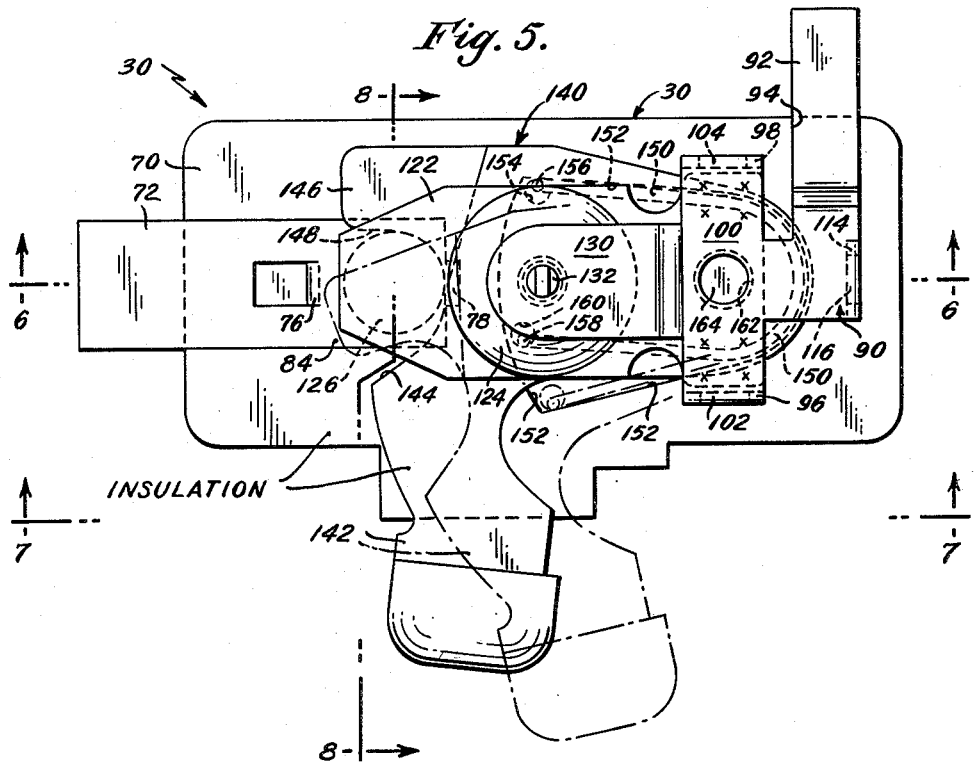
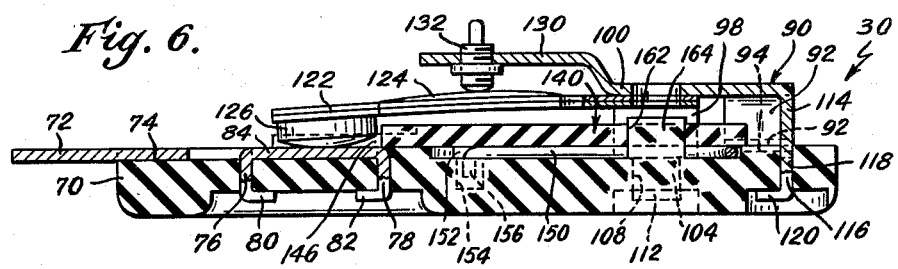
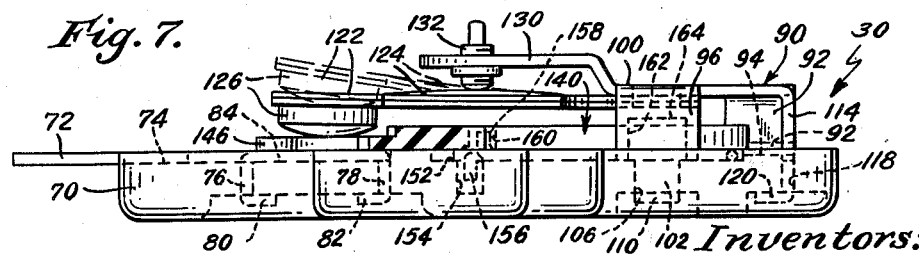

July 30, 1963    F. G. PERRY ET AL    3,099,732
ELECTRICAL CONTROL DEVICE
Filed May 31, 1961    3 Sheets-Sheet 3

Inventors:
Frederick G. Perry,
Aimé J. Grenier,
John J. Wilson III,
by Harold Levine Att'y.

United States Patent Office 3,099,732
Patented July 30, 1963

3,099,732
ELECTRICAL CONTROL DEVICE
Frederick G. Perry, Barrington, R.I., and Aimé J. Grenier, North Attleboro, and John J. Wilson III, Attleboro, Mass., assignors to Texas Instruments Incorporated, Dallas, Tex., a corporation of Delaware
Filed May 31, 1961, Ser. No. 113,847
21 Claims. (Cl. 200—122)

This invention relates to electrical control devices which are particularly suited for (though not limited to) controlling circuits for electrical motors having one or more windings. The invention, with regard to certain more specific features, is particularly concerned with the provision of a new and improved thermostatic switch and a new and improved combined relay and motor protector.

Among the several objects of this invention may be noted the provision of an electrical control device for controlling the circuits of and protecting the windings of an electric motor, said control, when properly connected in a motor circuit, being adapted to provide for protection of a motor, as well as being effective to properly de-energize the start of a phase winding of the motor as the motor comes up to speed; the provision of a new and improved thermally responsive switch and a new and improved combined relay and thermostatic switch wherein the latter serves as a motor protector; the provision of such controls and switches which are versatile in use, compact, low-cost, embody a minimum number of parts; the provision of controls of the class described which are simple in construction and economical to manufacture and assemble, and which provide for simple and low-cost installation on motors to which they are to be connected; the provision of a new and improved thermally responsive switch which is particularly suitable for use as a motor protector and also for use in a combined relay-motor protector control unit; the provision of controls of the class described which provide for manual reset operation of the motor protector or thermostatic switch by simple and inexpensive means.

Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of the various possible embodiments of the invention is illustrated:

FIG. 1 is a front elevational view of a control according to the present invention;

FIG. 2 is a view taken on line 2—2 of FIG. 1, with parts broken away for clarity of illustration;

FIG. 3 is a rear elevational view of the control shown in FIG. 1;

FIG. 4 is a view similar to FIG. 3, with the motor protector portion of the control omitted for clarity of illustration;

FIG. 5 is a top plan view of the thermally responsive switch or motor protector control shown in FIG. 1;

FIG. 6 is a sectional view taken on line 6—6 of FIG. 5;

FIG. 7 is a view taken on line 7—7 of FIG. 5, showing relative movement between parts, with certain parts thereof in section;

Similar reference characters indicate corresponding parts throughout the several views of the drawings.

Figure 8:
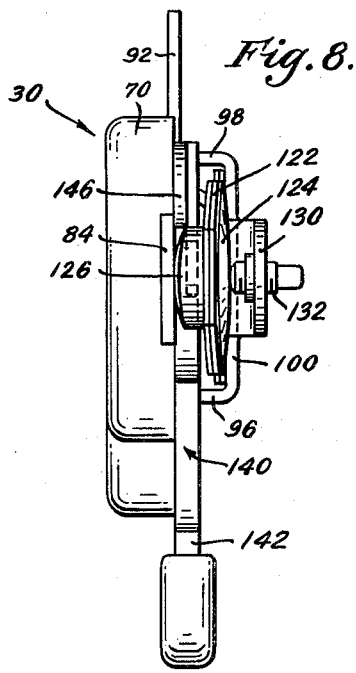
FIG. 8 is a view taken on line 8—8 of FIG. 5.

Dimensions of certain of the parts as shown in the drawings have been modified for the purposes of clarity of illustration.

Referring now to the drawings, a novel control device embodying the present invention is shown and indicated generally by numeral 10. Control 10 comprises an electrical relay portion and a thermally responsive switch or protector portion generally indicated respectively by numerals 20 and 30. Relay portion 20 may take the form of an electromagnetic relay similar to that shown and described in a copending United States patent application to Aimé J. Grenier, entitled Electrical Switch, Serial No. 32,176, filed May 27, 1960, and assigned to the assignee of the instant application, to which reference may be had for additional specific details of construction.

Electromagnetic relay portion 20 generally includes a casing member 22, a pair of stationary contacts 24 and 26 carried respectively by terminals 28 and 32, each of the latter being formed of suitable electrically conductive material. Relay portion 20 also includes a third electrically conductive terminal 34 formed of suitable electrically conductive material.

Figure 10:
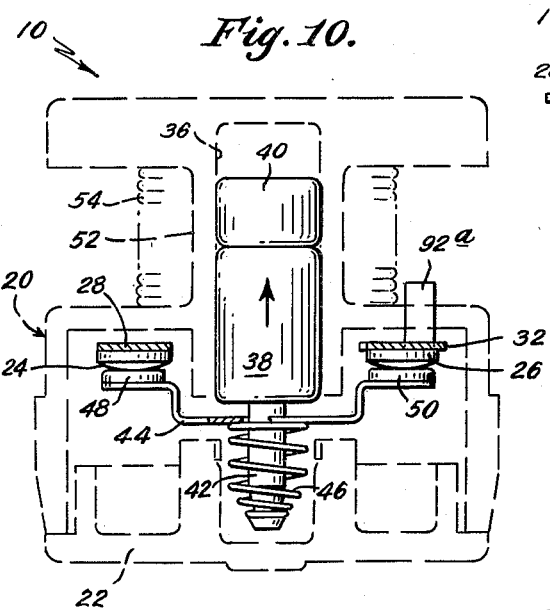
FIG. 10 is a view taken on line 10—10 of FIG. 2, with certain parts of the control shown in phantom for clarity of illustration.

Casing 22 is provided with a cylindrical bore or cavity 36 (see FIG. 10) within which is received an armature 38 and a non-magnetic slug or weight 40 of a plunger subassembly for reciprocal movement therein. The armature 38 is formed of a suitable magnetic material and includes a shank 42. An apertured movable bridging contact member 44 is slidably mounted on shank 42 for reciprocal movement thereon. As best seen in FIG. 10, spring 46 biases bridging contact member 44 for movement toward a contacts-closed position. Fixedly mounted and electrically connected to opposite ends of the bridging member, is a pair of electrical contacts 48 and 50, which are adapted to mate respectively with contacts 24 and 26.

Housing 22 also provides a cylindrical spool portion 52 (as best seen in FIG. 10) about which is disposed a plurality of mutually insulated turns of electrically conductive wire, which form a coil 54. As best seen in FIGS. 1 and 2, one end 56 of coil 54 is electrically connected to terminal 34, and the other end 58 of coil 54 is electrically connected to terminal 32, as by welding. It will be clear that when coil 54 is electrically energized by a predetermined value of current flowing therethrough, magnetic armature 38 will be moved upwardly, in the direction of the arrow shown in FIG. 10 to close contacts 24, 48 and 26, 50. When the current flowing through coil 54 goes below this predetermined value, armature 38 and non-magnetic slug 40 will move downwardly, as seen in FIG. 10, to open contacts 24, 48 and 26, 50.

Referring now to FIGS. 5–9, thermostatic switch or motor protector portion 30 comprises a base member 70 formed of a conventional insulating material, such as a moldable phenolic resinous material or a molded ceramic material. Thermally responsive switch 30 includes a terminal member 72 which is received within a complementary shaped recess 74 formed in the upper surface of base 70, whereby the upper surfaces of terminal 72 and base 70 are substantially flush, as best seen in FIGS. 5–7. Terminal 72 includes a pair of projecting fingers 76 and 78 which are received within suitable open-ended apertures formed in base member 70, as best seen in FIGS. 6 and 7. Ends 80 and 82 respectively of fingers 76 and 78, are deformed about base member 70, as shown, to firmly mount and retain terminal 72 in fixed assembled relation with respect to base 70. One end of terminal 72 projects beyond base 70 to facilitate electrical connection to an external circuit. Terminal 72 also provides a stationary or fixed electrical contact 84 adjacent its other end, as best seen in FIGS. 6–9.

Figure 9:
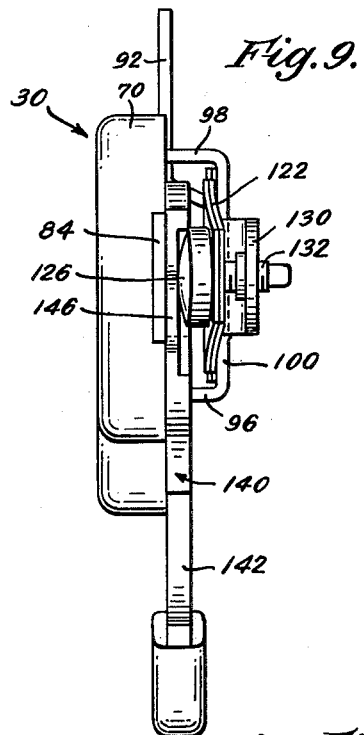
FIG. 9 is a view similar to FIG. 8, showing relative movement between parts.

Switch portion 30 includes a second electrically conducting terminal member 90. Terminal member 90 includes a portion 92 extending or projecting exteriorly of base member 70, as best seen in FIGS. 2, 3 and 5. Portion 92 lies in a plane spaced from the plane of the remainder or main body portion of the terminal and is received within a recess 94 formed in the upper surface of base 70 and is also disposed thereagainst, as best seen in FIGS. 2 and 6. Terminal member 90 includes a U-shaped main body portion defined by a pair of legs 96 and 98, extending transversely thereof, and a bight portion 100 which interconnects legs 96 and 98, as best seen in FIGS. 5, 8 and 9. Each of legs 96 and 98 is provided adjacent their free ends with a reduced width portion indicated respectively by numerals 102 and 104. The free ends of reduced width portions 102 and 104 are respectively received within appropriate apertures 106 and 108 provided by base member 70, and are bent over respectively at 110 and 112 to firmly secure the legs and terminal member 90 to base member 70, in the manner described above for projecting fingers or legs 76 and 78 of terminal 72.

Terminal member 90 adjacent one end thereof includes a third projecting leg 114 which is similar to legs 96 and 98, as clearly shown in FIGS. 5 and 6. Leg 114 includes a reduced width portion 116 and is received within a complementary shaped aperture 118 provided by base member 70. The free end of reduced width portion 116 is bent over, as at 120, to co-operate with bent-over portions 110 and 112 to tightly mount and fixedly position terminal member 90 in final assembled relation with respect to base member 70. The shoulders formed between projecting legs or fingers 96, 98 and 114, and their respective reduced width portions 102, 104 and 116 advantageously co-operate with their respective apertures in base member 70 to limit the depth of insertion of the legs within their respective apertures to accurately position terminal member 90, and parts mounted on or carried thereby, in spaced, final assembled relationship with respect to base member 70.

Thermostatic switch portion 30 includes a snap-acting composite thermostatic element 122 which may, for example, be a dished bimetallic disc or element of the type shown and described in the Spencer U.S. Patent No. 1,448,240 or in the Vaughan et al. U.S. Patent No. 2,317,831. Snap-acting thermostatic element 122 includes a deformed or dished non-developable portion 124 responsible for its snap action. Electrically connected to and mounted adjacent one end of thermostatic snap-acting element 122 is a movable electrical contact 126 positioned for mating engagement with contact 84 of stationary terminal 72. Contacts 84 and 126 may be formed of conventional electrical contact material, such as silver or silver alloys. Contact 126 may be secured to the free end of snap-acting thermal element 122 by riveting, welding or the like. Thermostatic element 122 is cantilever mounted and electrically connected to the undersurface of bight portion 100 of terminal 90, as by welding, as best seen in FIGS. 6 and 7. Integrally formed and extending from bight portion 100 is a spring finger or spring arm member 130. Spring member 130 is spaced from and overlies dished or deformed portion 124 of thermostatic member 122, as best seen in FIGS. 6 and 7. Spring member 130 includes a threaded aperture in which is disposed an adjusting screw member 132. Spring member 130 is biased for movement in a direction toward thermostatic snap-acting element 122. Adjusting screw 132 serves a dual function in providing for calibration of the thermal element 122 and also in acting as a limit stop by co-operating with the thermal element to prevent the latter from creeping to a contacts-open position prior to the occurrence of snap action. Calibration of the thermal element is effected by appropriate rotation of adjusting screw 132 which bears against dished portion 124 of element 122 in the position shown in FIG. 6. It should be understood that other forms of abutment means could be provided in place of adjusting screw 132. Such other forms, for example, may include a dimpled portion formed integrally with spring arm 130, in which case calibration would be effected by appropriately bending or deforming spring arm 130 and the dimpled portion thereof against deformed portion 124 of thermostatic member 122.

Arm 130, which mounts adjusting screw 132 for engagement with dished or non-developable portion 124 of thermostatic member 122, is in the nature of a spring arm resiliently biased for movement toward the thermostatic disc 122, to assure that screw 132 will remain in predictable spring pressure engagement with the non-developable portion 124 until the time that the thermostatic member 122 snaps from the contacts-closed position shown in solid lines in FIG. 7, to the contacts-open position shown in dashed lines in FIG. 7. This arrangement advantageously serves to preclude a reduction in contact pressure which might otherwise occur just prior to snapping of the thermostatic element from the contacts-closed to the contacts-open position. This advantageously serves to prevent the contact pressure from diminishing just prior to snap action, as is characteristic of many types of snap-acting devices. Spring member 130 is sufficiently flexible to maintain spring pressure against the upper side of the dished portion 124 throughout its flexure just prior to snapping, upon heating thereof to the snapping temperature, to maintain desired and substantially uniform contact pressure throughout the period immediately prior to snapping to open the contacts. This feature, in cooperation with the limit stop afforded by the lower end of adjusting screw 132, as seen in FIGS. 6 and 7, cooperates to prevent the snap-acting thermostatic element 122 from creeping to a contacts-open position prior to the occurrence of snap action.

Terminal member 90 and thermostatic member 122 may conveniently be mass produced as a separate subassembly, and can quickly and easily be mounted on base member 70 by inserting the respective reduced width leg portions 102, 104 and 116 within their respective openings in the base member 70, and quickly secured thereto in the manner described above.

Thermally responsive switch or protector 30 also provides for manual reset operation, in the form of means 140, a portion of which is interposable between contacts 84 and 126 when the latter move to a contacts-open position. As best seen in FIG. 5, means 140 generally takes the form of a rotatable lever, which includes a handle portion 142 extending into manually actuable position beyond base 70. Lever 140 is provided with an open-ended recess 144 (see FIG. 5) which is suitably larger than the contact 126 carried by thermostatic element 122, so as to provide adequate clearance therebetween and to assure proper operation, as will be more fully described below.

Lever 140 includes a tongue portion 146 (part of which is defined by aperture 144) which is somewhat thinner than the remainder of lever 140, as best seen in FIGS. 6 and 7. Tongue 146 is adapted to move from a contacts-closed position, as shown in solid lines in FIG. 5, wherein edge 148 of tongue 146 abuts the side of movable contact 126, as best seen in FIGS. 5 and 6, to a resetting position, as shown in dashed lines in FIG. 5 and in solid lines in FIG. 6, wherein tongue 146 is interposed between contacts 84 and 126 preventing mating interengagement thereof.

Switch 30 provides a spring means 150 which resiliently urges or biases lever or interposable means 140 for movement from a contacts-closed position (as shown in solid lines in FIG. 5) to a resetting position (as shown in dashed lines in FIG. 5). Spring means 150 is preferably bicornous in shape, for example, such as the U-shaped form illustrated in FIG. 5. Bicornous spring means 150 is received within a suitably shaped recess 152 provided in base member 70, to conveniently co-operate with the remainder of the parts of the thermostatic switch to provide a compact and minimum size device. Recess 152 provides an open-ended aperture 154, in which is disposed and anchored a bent-over portion 156 of one of the free ends of spring member 150. The other free end of spring member 150 is bent up, as at 158, and is received in an open-ended aperture 160 provided by slidable or rotatable lever 140.

Lever 140 provides an aperture 162 within which is loosely received an upstanding boss member 164 formed integrally with base member 70 to pivotally mount rotatable lever 140 on base 70. As best seen in FIG. 6, it is not necessary to otherwise deform or secure the rotatable lever to the base. In practice, to assemble the switch and rotatable lever, it is merely necessary to locate spring member 150 within the recess 152 and dispose turned down portion 156 in its aperture 154, thereafter to dispose lever 140 with boss 164 received in aperture 162, and upturned portion 158 of spring 150 received in aperture 160 of lever 140. Thereafter, when the terminal 90—thermostatic element 122 subassembly is mounted on base member 70, lever member 140 will be retained in place. There is insufficient clearance between the upper surface of the boss 164 and the lower surface of the thermostatic member 122 (as best seen in FIG. 6) for lever 140 to become disengaged from boss 164. Lever 140 is formed of an electrically insulating material, preferably one which provides a smooth, hard surface finish so as to prevent surface breakdown and scratching, to avoid formation of deposits thereof between the contacts 126 and 84, and creation of an undesirable electrically insulating barrier between the contacts.

The operation of thermal switch portion 30 is as follows. Assuming that the contacts 126 and 84 are initially closed, as shown in FIG. 6 and in solid lines in FIG. 7, and that a short circuit or current overload of a predetermined magnitude occurs in the circuit in which the switch is electrically connected, thermostatic element 122 (by reason of the electrical current passing through it) will be heated to its snapping temperature, and will snap to the contacts-open position shown in the dashed lines in FIG. 7. The moment contact 126 leaves contact 84, arm or tongue 146 is forced to move by spring 150 to the interposed position shown in dashed lines in FIG. 5 and in solid lines in FIG. 7. When the thermostatic disc or element 122 cools down to its reverse snapping temperature, in absence of interposed tongue 146, it would snap back to its former or FIG. 6 position, wherein contact 126 would again mate with contact 84. However, contact 126 is now separated from contact 84 by the interposition of electrically insulating tongue 146 and hence, the circuit remains broken. To reset the switch 30, that is to close the electrical circuit, manually actuable portion or arm 142 is manually pushed from the dashed-line position shown in FIGS. 1, 3 and 5 to the solid line position shown in these figures, against the action of spring 150 to force tongue 146 out from underneath contact 126, the spring force of the disc 122 then bringing contact 126 to bear against contact 84, the circuit thus being made again. Spring 150 preferably exerts relatively little spring force and thus advantageously reduces the force required for manual resetting of the switch. This feature is particularly advantageous in those installations where the reset button 142 is relatively inaccessible and it is difficult to bring much finger pressure to bear.

A feature of the switch just described is that the thermostatic disc or element 122 is trip free of the actuating handle 142. In other words, regardless of the position of handle 142 (for example, should it become stuck in any one position) the disc 122 is always free to snap to open-circuit position if its temperature reaches such a value as to impel it to do so. Thus, it is a distinct advantage, since it means that regardless of temporary inoperability of the manual means, the thermostatic means is always free to perform its circuit opening safety function. Interposable tongue 146 further serves to advantageously quickly extinguish or dissipate any arcing that might take place upon opening of the contacts 126 and 84. As best seen in FIG. 5, when contacts 126 and 84 are in the contacts-closed position, surface or edge 148 of tongue 146 abuts against the side of movable contact 126 and is prevented from moving between the contacts under the action of its spring 150. The resetting means is thus inoperative to move to the resetting position until after the movable contact 126 moves out of engagement with contact 84 in response to snap action of thermal element 122. Another advantage of our invention is that the manually operable resetting means does not influence or interfere with the snap action of the thermal element 122. In the arrangement according to the invention, the resetting means 140 does not deter or encourage the movement of thermal element 122 to separate contacts 84 and 126.

Disc 122 is advantageously of the so-called automatic type which, except for means 140, would ordinarily render switch 30 automatically resettable. Thus, if desired, switch 30 may quickly and easily be converted to the so-called automatic type merely by omitting lever 140 and spring 150.

Referring now to FIGS. 1–4, housing 22 of relay portion 20 provides a recess or cavity 23 opening exteriorly of the housing. Recess 23 is complementary in shape to, and receives therewithin, protector or switch portion 30, as best seen in FIGS. 2 and 3, wherein the outer surface of base 70 fits closely with the remainder of housing 22 of the relay portion 20. Terminal 32 of relay 20 mounts stationary contact 26 and extends transversely throughout the entire width of housing 22, and as best seen in FIGS. 2 and 4, projects through an open-ended aperture 29 in housing 22, which communicates with cavity 23. Terminal 32, which projects into cavity 23, is bent up as at 92a and mates and interfits with terminal portion 92 of protector 30. Portions 92 and 92a are electrically connected and fixedly secured together as by welding at 93. The connection between terminal portions 92 and 92a serves the multiple function of electrically connecting contacts 126 and 84 in series with coil 54, as well as serving to structurally and physically secure protector portion 30 and relay portion 20 together in final assembled relation. The corners of base member 70 may also be tacked to the relay cavity 23 and housing 22 with an adhesive, such as an epoxy or a sty cast material, to assure that protector 30 and the relay 20 will remain in fixed, final assembled relation.

Recess 23 also includes a cavity 25 (as best seen in FIG. 4) which receives and provides clearance for the upper projecting portion of adjusting screw 132, as seen in FIGS. 6 and 7. Surface portion 27 of relay casing or housing 22 adjacent cavity 23, as best seen in FIG. 4, provides a surface for rotating lever member 140 to bear against and rotate. Surface portion 27 cooperates with base 70 and lever 140 to prevent undesirable free play or movement of lever 140 in an upward direction relative to boss 164 (as seen in FIG. 6) and to retain lever member 140 in proper assembled relation.

From the above, it can be seen that each of the relay and switch or protector portions can conveniently be mass produced as individual subassembly units, and can easily and economically be quickly assembled into final assembled and operative relation, in the manner described.

The combined relay-protector control 10 may be electrically connected to a motor by making the proper electrical connections with only the three terminals, 34, 28 and 72. The small number of terminal connections required has the advantage of minimizing the danger of improper orientation and installation of the control, as well as providing for simple and low-cost installation.

Figure 11:
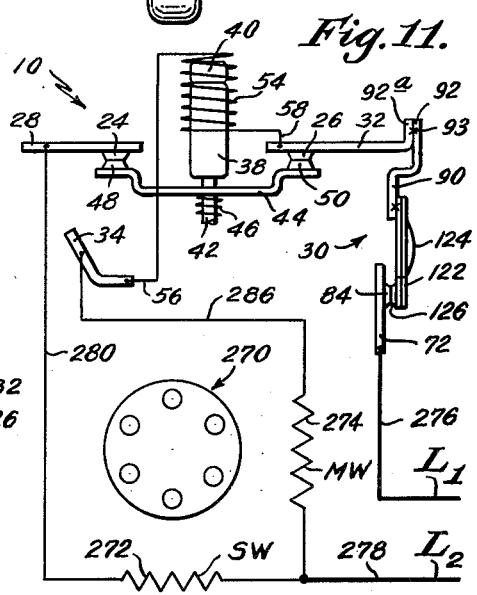
FIG. 11 is an exemplary schematic wiring diagram for the control illustrated in FIGS. 1–3, shown in combination with a split-phase electrical motor.

Referring now to the circuit diagram of FIG. 11, the control 10 is schematically illustrated in an exemplary circuit with a motor 270, having an auxiliary start or phase winding 272 and a main or running winding 274, which are respectively indicated in FIG. 11 by the letters SW and MW. One power supply line $L_1$ is connected by a conductor 276 to terminal 72. The other side of the power supply line $L_2$ is connected by conductor 278 to the common connection between the start winding 272 and the main winding 274 of the motor indicated generally by the numeral 270. The other end of the start winding 272 is connected by a conductor 280 to terminal 28. The other end of the main or running winding 274 is connected by a conductor 286 to terminal 34.

As thus connected, it will be observed that the current in the starting winding flows from $L_1$, one side of the power supply line, through conductor 276, to terminal 72, to contact 84, to contact 126, through thermally responsive snap-acting element 122, through terminal 90, to portion 92 thereof, to portion 92a of terminal 32, through terminal 32, to contact 26, to bridging contact 50, through bridging element 44, to bridging contact 48, to contact 24 to terminal 28, then by conductor 280 to the start winding 272, to its common connection with the main winding 274, then through conductor 278 to $L_2$, the other side of the power source.

Current through the main or running winding 274 flows from $L_1$, through conductor 276, to terminal 72, to contact 84, to contact 126, through snap-acting thermal element 122, to terminal 90, to portion 92 thereof, to terminal portion 92a of terminal 32, through terminal 32, to end 58 of coil 54, then serially through coil 54 to end 56 thereof, to terminal 34, then by conductor 286 to the main winding 274, to its common connection with the start winding 272, and then by conductor 278, to $L_2$, the other side of the power source.

The operation of control device 10 in the exemplary circuit described above is as follows: When the circuit of FIG. 11 is energized, to energize motor 270, a relatively large initial run winding current will energize coil 54 and cause armature 38 to move upwardly, as seen in FIG. 10, to move the bridging contacts 48 and 50 into respective engagement with contacts 24 and 26 to close the circuit for start winding 272. As the motor 270 comes up to speed, the run winding current will diminish and consequently diminish the level of energization in coil 54 to the point where armature 38 will move downwardly, as seen in FIG. 10, to quickly open contacts 24, 48 and 26, 50 to de-energize the start winding 272. Thereafter, line or run winding current will continue to traverse the thermal element 122, and coil 54. Under normal operating conditions of the motor 270 (after the start winding has been de-energized) the heat generated by the main winding current passing through the thermally responsive element 122, together with the heat of the motor (if control 10 is mounted for inherent protection, so as to be subject to the heat of the motor) will not be sufficient to raise the temperature of the thermally responsive element 122 to a point where it snaps to its position of opposite concavity, to open electrical contacts 84 and 126 to de-energize the motor. If, however, the motor (before or after the start winding is de-energized) becomes subject to one or more abnormal motor conditions which result in heavy starting and/or substantially increased run winding current so as to overheat thermal element 122 to its snapping temperature, the latter will snap to open the circuits of both windings, thus protecting the motor windings from overheating. Once the disc or thermal element 122 snaps to open the contacts 84, 126 and the circuit to the motor 270, the position of the manual reset arm 142 will change from an on position, as shown in solid lines in FIGS. 1 and 4, to an off position, as shown in dashed lines in these figures, thereby providing a visual indication that manual resetting of the switch is required to reinstate operation of the motor.

From the above, it can be seen that the combined relay-motor protector control 10 of our invention, advantageously affords a compact, low-cost control having a minimum number of parts which can be simply and inexpensively manufactured and assembled. It will also be clear that the control of the present invention is susceptible to diverse applications in control circuits, other than that illustrated by way of example in FIG. 11. For example, the control can be used in other than motor protective or control applications, and can also be employed with multispeed, dual-voltage, or other electric motors or energy-translating devices having one, two or more than two windings.

In view of the above, it will be seen that the several objects of the invention are achieved, and other advantageous results attained.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

We claim:

1. A thermostatic switch comprising a base; a first electrically conductive terminal mounted on said base; said terminal providing a first electrical contact; a second electrically conductive terminal mounted on said base in electrically insulated relation therewith; a composite snap-acting thermally responsive element electrically connected to and cantilever mounted on a portion of said second terminal; said element mounting a movable electrical contact for movement toward and away from engagement with said first contact in response to movement of said thermally responsive element; said element including a non-developable portion responsible for its snap action; manually operable resetting means movably mounted on said base and positioned intermediate said base and element; said resetting means being movable from a contacts-closed position to a resetting position; said resetting means in the resetting position preventing said movable contact from moving into engagement with said first contact; spring means urging said resetting means for movement from the contacts-closed to the resetting position; said resetting means being inoperative to move to the resetting position until after said movable contact moves out of engagement with said first contact; said second terminal including a member overlying at least a part of said non-developable portion; means on said member engageable with said nondevelopable portion tending to inhibit said thermally responsive element from moving to a contacts-open position prior to the occurrence of snap action; said last-named means also being movable with respect to said non-developable portion to effect calibration of said element.

2. A thermostatic switch comprising a base; a first electrically conductive terminal mounted on said base; said terminal providing a first electrical contact; a second electrically conductive terminal mounted on said base in electrically insulated relation therewith; a composite snap-acting thermally responsive element electrically connected to and cantilever mounted on a portion of said second terminal; said element mounting a movable electrical contact for movement toward and away from engagement with said first contact in response to movement of said thermally responsive element; said element including a non-developable portion responsible for its snap action; manually operable resetting means pivotally mounted on said base and positioned intermediate said base and element; said resetting means being rotatable from a contacts-closed position to a resetting position; said resetting means in the resetting position having a portion thereof disposed intermediate said contacts, preventing said movable contact from moving into engagement with said first contact; spring means urging said resetting means for movement from the contacts-closed to the resetting position; said resetting means being engageable with said movable contact when the latter is in a contacts-closed position and being inoperative to move to the resetting position until after said movable contact moves out of engagement with said first contact.

3. A thermostatic switch comprising a base; a first electrically conductive terminal mounted on said base; said first terminal providing a first electrical contact; a second electrically conductive terminal having a U-shaped portion; a composite, snap-acting thermally responsive device electrically connected to and mounted on the bight portion of said U-shaped portion of said second terminal; the free ends of the legs forming said U-shaped portion being attached to said base member and mounting said thermally responsive device in spaced relation to said base; a second electrical contact operatively connected with said device and positioned for movement toward and away from said first contact in response to movement of said thermally responsive device; said device including a non-developable portion responsible for its snap action; said bight portion including a member extending therefrom overlying at least a part of said non-developable portion; means on said member engageable with said non-developable portion tending to inhibit said thermally responsive device from actuating said contacts in at least one direction prior to the occurrence of snap action; and said last-named means also being movable with respect to said non-developable portion to effect calibration of said device.

4. The switch as set forth in claim 3 and wherein said spring member is formed integrally with said bight portion.

5. The switch as set forth in claim 3 and wherein said thermally responsive device is cantilever mounted on said bight portion.

6. The switch as set forth in claim 3 and wherein said last-named means comprises a screw member carried by said spring member in threaded engagement therewith.

7. A thermostatic switch comprising a base; a first electrically conductive terminal mounted on said base; said first terminal providing a first electrical contact; a second electrically conductive terminal having a U-shaped portion; a composite, thermally responsive device electrically connected to and mounted on the bight portion of said U-shaped portion of said second terminal; the free ends of the legs forming said U-shaped portion being attached to said base member and mounting said thermally responsive device in spaced relation to said base; and movably mounted interposable means in one position thereof preventing said first and second contacts from moving into interengagement when said thermally responsive device moves in a direction tending to bring said first and second contacts together; and spring means urging said interposable means for movement to said one position, said interposable means including a handle portion extending into manually actuatable position for moving said interposable means against said spring means.

8. A thermostatic switch comprising a base; a first electrically conductive terminal mounted on said base; said first terminal providing a first electrical contact; a second electrically conductive terminal having a U-shaped portion; a composite, snap-acting thermally responsive device electrically connected to and mounted on the bight portion of said U-shaped portion of said second terminal; the free ends of the legs forming said U-shaped portion being attached to said base member and mounting said thermally responsive device in spaced relation to said base; a second electrical contact operatively connected with said device and positioned for movement toward and away from said first contact in response to movement of said thermally responsive device; said device including a non-developable portion responsible for its snap action; said bight portion including a member extending therefrom overlying at least a part of said non-developable portion; means on said member engageable with said non-developable portion tending to inhibit said thermally responsive device from actuating said contacts in at least one direction prior to the occurrence of snap action; said last-named means also being movable with respect to said non-developable portion to effect calibration of said device; and interposable means disposed intermediate said base and thermally responsive device; said interposable means being rotatably mounted on said base for movement between first and second positions; said interposable means in said first position including a portion thereof disposed intermediate said first and second contacts preventing said first and second contacts from moving into interengagement when said thermally responsive device moves in a direction tending to bring said first and second contacts together; spring means disposed intermediate said interposable means and said base urging said interposable means for movement to said first position; said interposable means in the second position being engageable with said second contact when the latter is in a contacts-closed position and being restrained from moving to said first position until after said contacts are separated; said interposable means being so shaped and arranged as not to deter or encourage the movement of said thermally responsive device to separate said contacts; and said interposable means including a handle portion extending into manually actuatable position for moving said interposable means against said spring means.

9. The switch as set forth in claim 8 and wherein said spring means comprises spring biased, bicornous shaped means and is disposed within a complementary shaped recess provided by said base; one end of said spring means being connected with said interposable means, and the other end thereof being connected with said base.

10. An electrical control device adapted for control of an energy-translating device having at least one winding; said device comprising a housing; a pair of electrical contacts disposed within said housing adapted to control a circuit for said winding; said device including a coil and an armature associated in a magnetic circuit with said coil; said armature being arranged to actuate said contacts when said coil is energized by a predetermined flow of electrical current therethrough; said device including a plurality of electrical terminals; one of said terminals being electrically connected with said coil; said housing providing a recess opening exteriorly of said device; a thermostatic switch assembly comprising a base; said base being complementary in shape to and disposed within said recess in said housing to enclose said switch assembly within said recess; a first electrically conductive switch terminal mounted on said base; said first terminal providing a first thermostatic electrical switch contact; a second electrically conductive terminal mounted on said base in electrically insulated relation therewith; a composite snap-acting thermally responsive device electrically connected to and mounted on a portion of said second terminal; a second thermostatic electrical switch contact operatively connected with said snap-acting device and positioned for movement toward and away from said first switch contact in response to movement of said thermally responsive device; and one of said first and second thermostatic switch terminals being electrically connected as by welding with said one terminal thereby electrically connecting said thermostatic switch assembly contacts with said coil and tending to maintain said thermostatic switch assembly in fixed assembled relation within said housing recess.

11. An electrical control device adapted for control of an electrical energy-translating device having at least two windings; said device comprising a housing; a pair of electrical contacts disposed within said housing adapted to control a circuit for one of said windings; said device including a coil and an armature associated in a magnetic circuit with said coil; said armature being arranged to actuate said contacts when said coil is energized by a predetermined flow of electrical current therethrough; said device including a plurality of electrical terminals; one of said terminals being electrically connected with said coil; said housing providing a recess opening exteriorly of said device; a thermostatic switch assembly comprising a base; said base being complementary in shape to and disposed within said recess in said housing to enclose said switch assembly within said recess; a first electrically conductive switch terminal mounted on said base; said first switch terminal providing a first thermostatic electrical switch contact; a second electrically conductive switch terminal mounted on said base in electrically insulated relation therewith; a composite snap-acting thermally responsive element electrically connected to and cantilever mounted on a portion of said second switch terminal; said element mounting a movable electrical switch contact for movement toward and away from engagement with said first switch contact in response to movement of said thermally responsive element; said element including a non-developable portion responsible for its snap action; manually operable resetting means movably mounted on said base and positioned intermediate said base and snap-acting element; said resetting means being movable from a contacts-closed position to a resetting position; said resetting means in the resetting position preventing said movable switch contact from moving into engagement with said first switch contact; spring means urging said resetting means for movement from the contacts-closed to the resetting position; one of said first and second switch terminals being electrically connected as by welding with said one terminal thereby electrically connecting said thermostatic switch assembly contacts with said coil and tending to maintain said thermostatic switch assembly in fixed assembled relation within said housing recess; said thermally responsive switch assembly being adapted to control circuits for said windings of said electrical energy-translating device in response to predetermined temperature and current conditions; and said coil being electrically connectable in series with the one of said windings.

12. An electrical control device adapted for control of an electrical energy-translating device having at least two windings; said device comprising a housing; a pair of electrical contacts disposed within said housing adapted to control a circuit for one of said windings; said device including a coil and an armature associated in a magnetic circuit with said coil; said armature being arranged to actuate said contacts when said coil is energized by a predetermined flow of electrical current therethrough; said device including a plurality of electrical terminals; one of said terminals being electrically connected with said coil; said housing providing a recess opening exteriorly of said device; a thermostatic switch assembly comprising a base; said base being complementary in shape to and disposed within said recess in said housing to enclose said switch assembly within said recess; a first electrically conductive switch terminal mounted on said base; said first switch terminal providing a first thermostatic electrical switch contact; a second electrically conductive switch terminal having a portion thereof U-shaped; a composite, snap-acting thermally responsive device electrically connected to and mounted on the bight portion of said U-shaped portion of said second switch terminal; the free ends of the legs forming said U-shaped portion being attached to said base member and mounting said thermally responsive device in spaced relation to said base; a second thermostatic electrical switch contact operatively connected with said device and positioned for movement toward and away from said first switch contact in response to movement of said thermally responsive device; said device including a non-developable portion responsible for its snap action; said bight portion including a member extending therefrom overlying at least a part of said non-developable portion; means on said member engageable with said non-developable portion tending to inhibit said thermally responsive device from actuating said switch contacts in at least one direction prior to the occurrence of snap action; said last-named means also being movable with respect to said non-developable portion to effect calibration of said device; said second switch terminal being electrically connected as by welding with said one terminal thereby electrically connecting said thermostatic switch assembly contacts with said coil and tending to maintain said thermostatic switch assembly in fixed assembled relation within said housing recess; said thermally responsive switch assembly being adapted to control circuits for said windings of said electrical energy-translating device in response to predetermined temperature and current conditions; and said coil being electrically connectable in series with the other of said windings.

13. An electrical control device comprising a housing; a pair of electrical contacts disposed within said housing; said device including a coil and an armature associated in a magnetic circuit with said coil; said armature being arranged to actuate said contacts when said coil is energized by a predetermined flow of electrical current therethrough; said device including a plurality of electrical terminals; one of said terminals being electrically connected with said coil; said housing providing a recess opening exteriorly of said device; a thermostatic switch assembly comprising a base; said base being complementary in shape to and disposed within said recess in said housing to enclose said switch assembly within said recess; a first electrically conductive switch terminal mounted on said base; said first switch terminal providing a first thermostatic electrical switch contact; a second electrically conductive switch terminal mounted on said base and electrically connected with a second thermostatic electrical switch contact; thermally responsive means operatively connected with said second switch contact for movement thereof into and out of engagement with said first switch contact; and movably mounted manually operable interposable means in one position thereof preventing said first and second switch contacts from moving into interengagement and spring means urging said interposable means for movement to said one position; said interposable means including a handle portion extending outwardly of said housing into manually actuatable position for moving said interposable means against said spring means; and said second switch terminal being electrically connected as by welding with said one terminal thereby electrically connecting said thermostatic switch assembly contacts with said coil and tending to maintain said thermostatic switch assembly in fixed assembled relation within said housing recess.

14. In combination: an electrically conductive member; a portion of said member being U-shaped, said U-shaped portion including a bight portion and a pair of legs interconnected with said bight portion and extending transversely thereof; said bight portion and legs defining said U-shaped portion; a composite thermally responsive member positioned intermediate said legs and cantilever mounted on and electrically connected to said bight portion as by welding; said electrically conductive member and thermally responsive member comprising a subassembly unit, said legs being connectable with a support to firmly mount said subassembly unit thereon, with said thermally responsive member in predetermined spaced relationship with said support.

15. In combination: an electrically conductive member; a portion of said member being U-shaped, said U-shaped portion including a bight portion and a pair of legs interconnected with said bight portion and extending transversely thereof, said bight portion and legs defining said U-shaped portion; a composite thermally responsive snap-acting member positioned intermediate said legs and cantilever mounted on and electrically connected to said bight portion as by welding; said electrically conductive member and thermally responsive member comprising a subassembly unit; said legs being connectable with a support to firmly mount said subassembly unit thereon with said thermally responsive member in predetermined spaced relationship with said support; said snap-acting member having a deformed portion therein responsible for its snap action; a spring arm formed integrally with said bight portion and extending therefrom in overlying relationship with respect to said snap-acting member and with respect to at least a portion of said deformed portion; means carried by said spring arm engageable with said deformed portion for effecting calibration of said snap-acting member and for preventing actuation thereof prior to snap action in at least one direction; and said spring arm being resiliently biased in a direction for engaging said means with said deformed portion.

16. An electrical control device comprising a housing; at least a pair of electrical contacts disposed within said housing; said device including a coil and an armature associated in a magnetic circuit with said coil; said armature being arranged to actuate said contacts when said coil is energized by a predetermined flow of electrical current therethrough; said device including a plurality of electrical terminals; one of said terminals being electrically connected with said coil; said housing providing a recess opening exteriorly of said device; a thermostatic switch assembly comprising a base; said base being complementary in shape to and disposed within said recess in said housing to enclose said switch assembly within said recess; a first electrically conductive switch terminal mounted on said base; said first switch terminal providing a first thermostatic electrical switch contact; a second electrically conductive switch terminal mounted on said base in electrically insulated relation therewith; a second electrically conductive thermostatic electrical switch contact electrically connected with said second switch terminal; said thermostatic switch assembly also including thermally responsive means operatively connected with said second thermostatic switch contact for movement of the latter into and out of engagement with said first switch contact at predetermined conditions; one of said first and second thermostatic switch terminals being electrically connected as by welding with said one terminal thereby electrically connecting said thermostatic switch assembly contacts with said coil and tending to maintain said thermostatic switch assembly in fixed assembled relation within said housing recess.

17. A thermostatic switch comprising a base; a first electrically conductive terminal mounted on said base; said terminal providing a first electrical contact; a second electrically conductive terminal mounted on said base in electrically insulated relation therewith; a composite snap-acting thermally responsive element electrically connected to and cantilever mounted on a portion of said second terminal; said element mounting a movable electrical contact for movement toward and away from engagement with said first contact in response to movement of said thermally responsive element; said element including a non-developable portion responsible for its snap action; manually operable resetting means movably mounted on said base and positioned intermediate said base and element; said resetting means being movable from a contacts-closed position to a resetting position; said resetting means in the resetting position having a portion thereof disposed intermediate said contacts, preventing said movable contact from moving into engagement with said first contact; spring means urging said resetting means for movement from the contacts-closed to the resetting position; said resetting means being engageable with said movable contact when the latter is in a contacts-closed position and being inoperative to move to the resetting position until after said movable contact moves out of engagement with said first contact.

18. In combination: an electrically conductive member; a portion of said member being U-shaped, said U-shaped portion including a bight portion and a pair of legs interconnected with said bight portion and extending transversely thereof, said bight portion and legs defining said U-shaped portion; a composite thermally responsive snap-acting member positioned intermediate said legs and cantilever mounted on and electrically connected to said bight portion as by welding; said electrically conductive member and thermally responsive member comprising a subassembly unit; said legs being connectable with a support to firmly mount said subassembly unit thereon with said thermally responsive member in predetermined spaced relationship with said support; said snap-acting member having a deformed portion therein responsible for its snap action; an arm formed integrally with said bight portion and extending therefrom in overlying relationship with respect to said snap-acting member and with respect to at least a portion of said deformed portion; and means carried by said arm engageable with said deformed portion for effecting calibration of said snap-acting member and for preventing actuation thereof prior to snap action in at least one direction.

19. The combination as set forth in claim 18 and wherein said last named means comprises a screw member carried by said arm in threaded engagement therewith.

20. The switch as set forth in claim 1 and wherein said member overlying at least a part of said non-developable portion comprises a spring member biased for movement toward said non-developable portion.

21. The switch as set forth in claim 3 and wherein said member overlying at least a part of said non-developable portion comprises a spring member biased for movement toward said non-developable portion.

References Cited in the file of this patent

UNITED STATES PATENTS

| | | |
|---|---|---|
| 2,521,120 | Harrold | Sept. 5, 1950 |
| 2,801,315 | Rosenberg et al. | July 30, 1957 |
| 2,820,870 | Moksu | Jan. 21, 1958 |